(12) United States Patent
Carter

(10) Patent No.: US 9,146,985 B2
(45) Date of Patent: Sep. 29, 2015

(54) TECHNIQUES FOR EVALUATING PATENT IMPACTS

(75) Inventor: Stephen R. Carter, Spanish Fork, UT (US)

(73) Assignee: Novell, Inc., Provo, UT (US)

( * ) Notice: Subject to any disclaimer, the term of this patent is extended or adjusted under 35 U.S.C. 154(b) by 523 days.

(21) Appl. No.: 11/969,994

(22) Filed: Jan. 7, 2008

(65) Prior Publication Data

US 2009/0177656 A1   Jul. 9, 2009

(51) Int. Cl.
*G06F 17/30* (2006.01)

(52) U.S. Cl.
CPC .... *G06F 17/30663* (2013.01); *G06F 17/30616* (2013.01); *G06F 2216/11* (2013.01)

(58) Field of Classification Search
CPC .............................................. G06F 17/30616
USPC ............. 707/100, 6, 706, 731, 780, 777, 708, 707/707; 715/209, 208
See application file for complete search history.

(56) References Cited

U.S. PATENT DOCUMENTS

| | | | |
|---|---|---|---|
| 5,619,709 A * | 4/1997 | Caid et al. ...................... 715/209 |
| 5,873,056 A * | 2/1999 | Liddy et al. ........................ 704/9 |
| 6,571,241 B1 | 5/2003 | Nosohara | |
| 2002/0049707 A1 | 4/2002 | Townsley | |
| 2003/0126165 A1* | 7/2003 | Segal et al. .................... 707/206 |
| 2003/0187832 A1 | 10/2003 | Reader | |
| 2004/0064438 A1* | 4/2004 | Kostoff .............................. 707/1 |
| 2004/0220842 A1* | 11/2004 | Barney ............................... 705/7 |
| 2005/0022106 A1* | 1/2005 | Kawai et al. ................... 715/500 |
| 2005/0055347 A9* | 3/2005 | Cho et al. ........................... 707/5 |
| 2005/0144177 A1* | 6/2005 | Hodes ............................ 707/100 |
| 2006/0200452 A1 | 9/2006 | Lee et al. | |
| 2007/0073653 A1 | 3/2007 | Raab | |
| 2007/0219988 A1 | 9/2007 | Mueller et al. | |
| 2007/0233657 A1 | 10/2007 | Horng et al. | |
| 2007/0266020 A1* | 11/2007 | Case et al. ......................... 707/5 |
| 2007/0266025 A1* | 11/2007 | Wagner et al. .................... 707/7 |
| 2007/0288256 A1* | 12/2007 | Speier ............................... 705/1 |
| 2009/0177656 A1* | 7/2009 | Carter .............................. 707/6 |
| 2009/0185626 A1* | 7/2009 | Seupel et al. ............. 375/240.26 |
| 2010/0049684 A1* | 2/2010 | Adriaansen et al. ............ 706/46 |

OTHER PUBLICATIONS

Miike et al., A Full—Text Retrieval System with a Dynamic Abstract Generation Function, 1994, pp. 152-161.*

* cited by examiner

*Primary Examiner* — Mohammad S Rostami
(74) *Attorney, Agent, or Firm* — Schwegman Lundberg & Woessner, P.A.

(57) ABSTRACT

Techniques for evaluating patent impacts are provided. A claim of a patent is normalized and an abstract of the claim is generated. The abstract is used to search a repository of target sources and their corresponding abstracts. Related abstracts found during the search are returned for purposes of evaluating the claim in view of data sources associated with the related abstracts.

11 Claims, 3 Drawing Sheets

TECHNIQUES FOR EVALUATING PATENT IMPACTS

BACKGROUND

Protecting intellectual property is of enormous importance in today's highly technical world economy. Membership of countries into the World Trade Organization often depends on how well those countries recognize and enforce intellectual property rights of intellectual property holders. Everyday there is news of two large companies disputing each others property rights in our courts. Additionally, the United States Patent and Trademark Organization (PTO) is grappling with huge patent backlogs as patent filings continue to rise at a staggering pace.

It is therefore not surprising that enterprises utilize a substantial amount of time and resources in developing and protecting their intellectual property assets. This is done with the expectation that the enterprises can gain a competitive advantage in the marketplace. The large investment and work done by enterprises are the primary reasons why the governments, courts, and government agencies are becoming overwhelmed with work related to protecting, adjudicating, and evaluating intellectual property.

The most desirable form or intellectual property that an enterprise can hold is a patent. With a patent, an enterprise can exclude others from making, using, importing, and selling their prescribed invention. The claims of enterprise's patent define the metes and bounds of what an enterprise can legitimately lay claim to.

Yet, obtaining patent protection is expensive and time consuming; therefore, it is in the best interest of the patentee, PTO, and the marketplace as a whole that any existing publications (sources) related to what the patentee seeks to patent are found and evaluated during the patent process. There are a plethora of sources in a multitude of languages that can be potentially evaluated.

It is impractical and unrealistic to believe that even the surface can be scratched for purposes of determining what publications are available for proper evaluation. A patentee or an examiner could spend a year or more parsing through sources and still may not find something that was relevant. Thus, it is not surprising that sources related to a patent can turn up in litigation years later when those sources were never found when the patent was initially evaluated.

In fact, it is a huge challenge to locate relevant sources related to claims of a patent or a pending patent application. One hurdle has been addressed and that is making most sources available in electronic format and accessible via the World-Wide Web (WWW) and Internet; although to a large extent this is still an ongoing process.

Thus, improved and automated techniques are needed for evaluating the impact of patents and their claims in view of available electronic sources of information.

SUMMARY

In various embodiments, techniques for acquiring related data sources for a patent claim are presented. More specifically, claims are from a patent document and the claims are normalized into an extracted normalized claim format. Next, an abstract is produced representing the normalized claim format. The abstract is then compared against a repository of additional abstracts and related ones of the additional abstracts are returned in response to the compare.

DETAILED DESCRIPTION

A "patent document" as used herein refers to an existing patent (from any country of the world), a pending application for a patent, or a draft patent application that has not been submitted to any government agency and may be incomplete. A common denominator for what is a patent document is that a patent document includes claims.

A "spoken language" is one that people use for verbal communication. Thus, as used herein a spoken language is not a computer programming or interpreted language. Each spoken language may include its own unique dialect, such that the unique dialect may be viewed as its own unique spoken language.

A "semantic abstract" refers to a process for defining and determining concepts within sentences of a document and determining how related and close each concept is to other concepts within the document and a semantic space related to the concepts. Semantic abstracts may include one or more assigned categories or concepts and/or rankings for those categories and concepts.

Some example techniques for producing semantic abstracts and defining semantic spaces within documents and repositories may be found at U.S. Ser. No. 09/615,726, entitled "A Method and Mechanism for the Creation, Maintenance and Comparison of Semantic Abstracts," filed on Jul. 13, 2000; U.S. Ser. No. 09/512,963, entitled "Construction, Manipulation, and Comparison of a Multi-Dimensional Semantic Space," filed on Feb. 25, 2000; U.S. Ser. No. 09/691,629, entitled "Method and Mechanism for Superpositioning State Vectors in a Semantic Abstract, filed on Oct. 18, 2000; and U.S. Pat. No. 6,108,619, entitled "Method and Apparatus for Semantic Characterization of General Content Streams and Repositories," issued on Aug. 22, 2000. The disclosures of which are incorporated by reference herein.

Various embodiments of this invention can be implemented in existing network architectures. For example, in some embodiments, the techniques presented herein are implemented in whole or in part in the Novell® network and proxy server products and/or knowledge based products, distributed by Novell®, Inc., of Provo, Utah.

Of course, the embodiments of the invention can be implemented in a variety of architectural platforms, operating and server systems, or applications. Any particular architectural layout or implementation presented herein is provided for purposes of illustration and comprehension only and is not intended to limit aspects of the invention.

Figure 1:
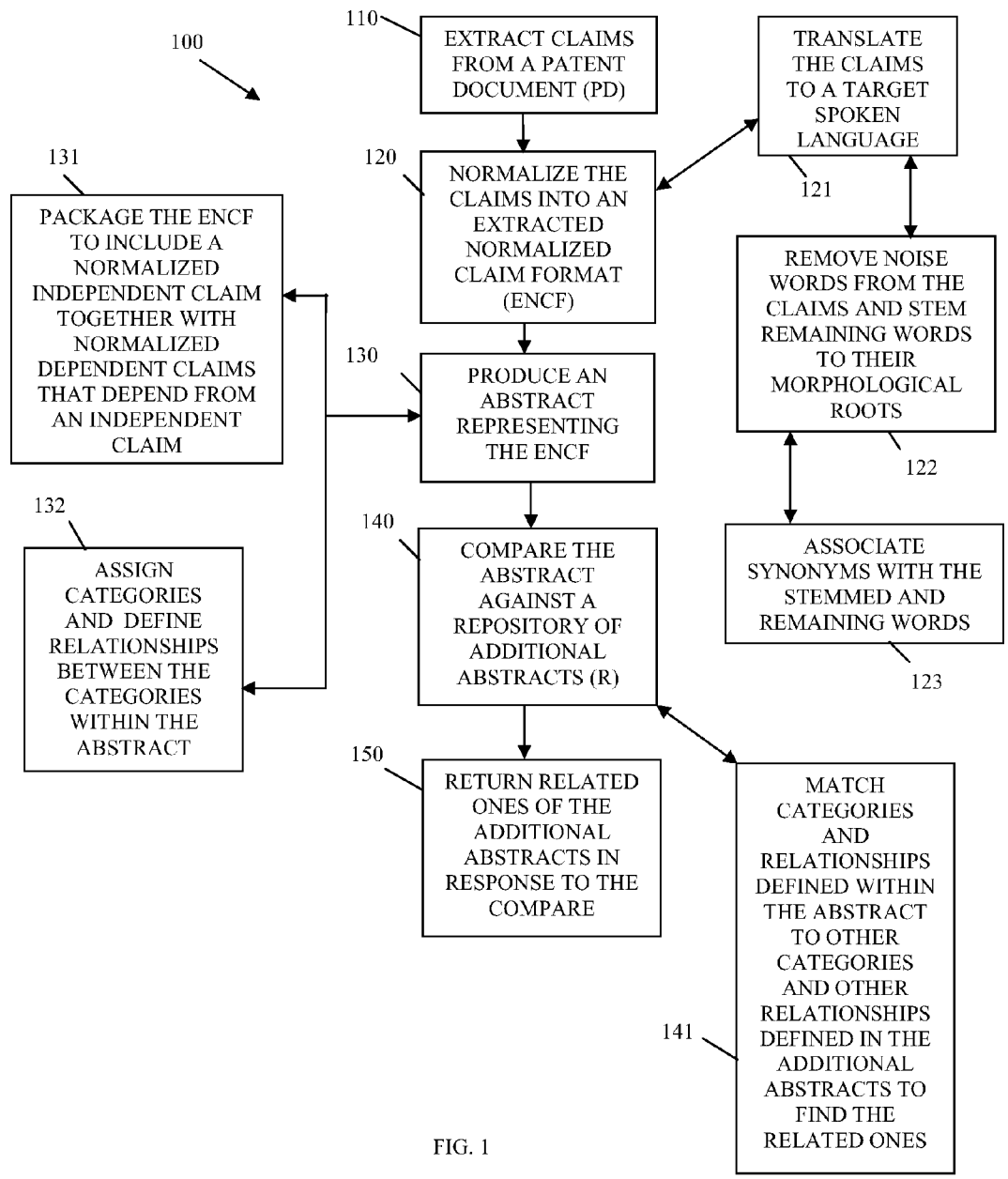
FIG. 1 is a diagram of a method for acquiring related data sources for a patent claim, according to an example embodiment.

FIG. 1 is a diagram of a method 100 for acquiring related data sources for a patent claim, according to an example embodiment. The method 100 (hereinafter "patent claim search service") is implemented in a machine-accessible and readable medium. The patent claim search service is operational over and processes within a network. The network may be wired, wireless, or a combination of wired and wireless.

At 110, the patent claim search service extract claims from a patent document. This can be done in a variety of manners using existing or even modified parsing applications. For example, the published patent applications and issued patent applications at the United States Patent and Trademark Organization (USPTO) are encoded with a tagging scheme that easily permits recognition of the claims in those types of patent documents. In other cases, the claims are often clearly distinguished and set apart in the text of the patent document, such that recognition of the claims is readily achieved. In yet more cases, the patent document may in a portable format such as, but not limited to, extensible markup language (XML), and the like. Thus, finding the beginning and ending portion of each patent claim in a patent document is easily achieved via automated techniques.

At 220, the patent claim search service normalizes the claims into an extracted normalized claim format. Here, a variety of linguistical applications can be employed in cooperation with the patent claim search service to make the words of the claims and concepts and structure of the claims defined in an automated fashion that can be processed and ranked in terms of relevance by automated services.

For example, at 121, the patent claim search service can translate the words of the claims into a target language. So, if the patent document is associated with a Japanese patent, the patent claim search service can be configured to translate the claims into English (a target spoken language). Therefore, the patent claim search service can normalize in the sense that the patent document is taken from one spoken language to another spoken language that is desired by a user or resource that interacts with the patent claim search service.

In another case, at 122, the patent claim search service removes noise words from the claims and stems the remaining words of the claim into their morphological roots. For example, words such as "a" and "the" may, in some instances be viewed as noise words; although in the patent claim situation, the words that one may typically view as noise words such as "and" and "or" are not noise words but vital structure to the patent claims being normalized. In fact, there may be very few noise words in the patent case, but in some embodiments, the patent claim search service has the ability to remove noise words. Moreover, what is and what is not a noise word can be configured into the processing associated with the patent claim search service, such that noise words are defined via tables and the tables are dynamically read and used by the patent claim search service. In this manner, depending upon the technology of the patent claim a user can provide a set of known noise words for processing.

At 122, the patent claim search service also puts the remaining non-noise words of the claim into their morphological roots. A morphological root reduces the size of the word down to a root. The root can be used as a search term rather than the native word in order to achieve better search results. For example, suppose the claim word is "associating." In this case, words that are also related to associating include "associate," "associated," and "association." By reducing, the native word "associating" to "associat" (root form) all the variations can be detected and compared. So, this is a form of normalization on the claim words.

In still another case, at 123, the patent claim search service can associated or link various synonyms to the morphological root form of the remaining words of the patent claim. The synonyms can be acquired via domain specific lexicons or dictionaries. Moreover, the synonyms themselves may be in morphological formats. In addition to synonyms, thesauri may be used to also augment and expand the relationships of the words in the patent claims to related words and concepts. Again, the thesauri words may be retained in morphological root form.

The patent claim search service can also retain structure defined in the patent claim. One technique for achieving this is to recognize that within the patent domain a semicolon character ";" is often used to offset defined method steps and elements of system or apparatus claims. So, structure or concepts within a semicolon are more related or are used to define a particular limitation or feature of the patent claim. So, normalization can retain this structure.

In still another situation, the frequency of a particular word as it appears within the patent claim or within the corpus of patent claims that exist for the same patent document can be retained as metadata for the normalized patent claim. This frequency attribute on a patent claim word can be used to define rankings or importance of any given word in view of a particular claim or the entire corpus of patent claims for the patent document being evaluated.

Also, the normalized words of the claim can be linked to categories or concepts. This mapping includes relevancy links to related categories and concepts. For example, the term "SSL" (associated with secure socket layer protocol) can be found in a networking dictionary or thesaurus and associated with a topic of "protocol;" and "protocol" may be associated with a broader topic of networking or a narrower sub topic of security protocols. These relationships are known and exist in electronic repositories. The structure can be found in the electronic table of contents or indexes of electronic information. Furthermore these concepts and their relationships can include dynamic rankings as well, such as a ranking from 0 to 10 with 0 being not related and 10 being directly related. In the example scenario, the topic of "custom" may have a 1 ranking when compared to protocol in the case of a patent claim, such as when other terms in the patent claim suggest other networking terms, so as to more or less preclude any association to the term "custom" from being related to the term protocol. In the same example, since SSL was a discovered word related to protocol, a finding of HTTPS (Hypertext Transfer Protocol over SSL) may receive a ranking of 8 or even 9, suggesting that this topic is closely tied to the claim word. It is apparent, that a variety of techniques can be used to normalize and augment the patent claim and expand its meaning in an automated and electronic fashion that permits automated processing and understanding.

For example, suppose a single patent claim being analyzed and normalized in an automated and dynamic fashion includes 5 terms all related to networking security as discovered by searching table of contents, hierarchies, and/or indexes. Each particular word can receive specific rankings to related concepts and categories using the strong correlation that the claim is classified as a network security claim.

According to an embodiment, the degree to which concepts are expanded or not expanded can be a user-controlled feature. For example, suppose the user wants to just see sources of data related to the patent claim that are directly related (high precision), this means that any answer set returned will likely have nothing in it that is not related. It also means a large class of sources may be excluded (low recall). As recall improves (number of potential answer set items in a search) the precision decreases (of the answer set items what is the percentage that is directly related) and vice versa. A user can configure a general ranking (0-10) to custom effect the recall and precision.

At 130, the patent claim search service produces an abstract that represents the extracted and normalized claim format. Examples of producing a specific type of abstract (such as a semantic abstract) were discussed and incorporated by reference above. The abstract may or may not be in a form that is human understandable. However, the abstract is in an electronic format that permits it to be used as a search query against other abstracts associated with other data sources. So, the abstract can be a combination of terms and metadata (category or semantic space assignment, term frequency, etc.) and structure (dependencies, relationships, etc.).

In an embodiment, at 131, the patent claim search service packages the extracted and normalized claim format to include a particular independent claim of the patent document and all of its dependent claims. Thus, the abstract can be created for a whole embodiment claimed by way of several claims all related by virtue of a same independent parent claim.

Again, at 132, the patent claim search service can assign categories and define relationships between the categories within the abstract. So, as was described above with reference to the normalization, abstract categories can be related or independent of one another and this can be kept track of and represented within the abstract.

At 140, the patent claim search service compares the produced abstract against a repository of additional abstracts. This can be done in a variety of manners. For example, a score can be used to compare how much of the produced abstract matches portions of one of the additional abstracts. If the score falls within a predefined range, then the abstracts associated with that score are considered to be related. The range for the score can also be a configured parameter to the processing of the patent claim search service.

According to an embodiment, at 141, the patent claim search service matches categories and relationships define within the abstract to other categories and other relationships defined in the additional abstracts of the repository for purposes of finding related abstracts.

At 150, the patent claim search service returns related ones of the additional abstracts in response to the compare. Essentially, a search of abstracts is done using the produced abstract for the patent claim and related abstracts are returned. But, an exact compare does not have to occur rather components of the abstract are compared to components of the additional abstracts. If a desirable or predetermined score range of values is achieved, within a defined range or threshold, then that abstract associated with the score is considered related and returned.

The related abstracts are linked to specific source documents or information.

It is now appreciated how a patent claim can be parsed from a patent document, normalized, represented as an abstract and then searched against a repository of other abstracts to find related abstracts.

The repository can be a variety of source locations available via databases, secure network, secure search services, the Internet, and the like. The abstracts can be produced periodically (indexed) and housed in the same or different locations. The various locations having the abstracts logically represent the repository. In other cases, depending upon the size of a target site, the abstracts of can be dynamically generated just before a needed search is processed against the repository.

Figure 2:
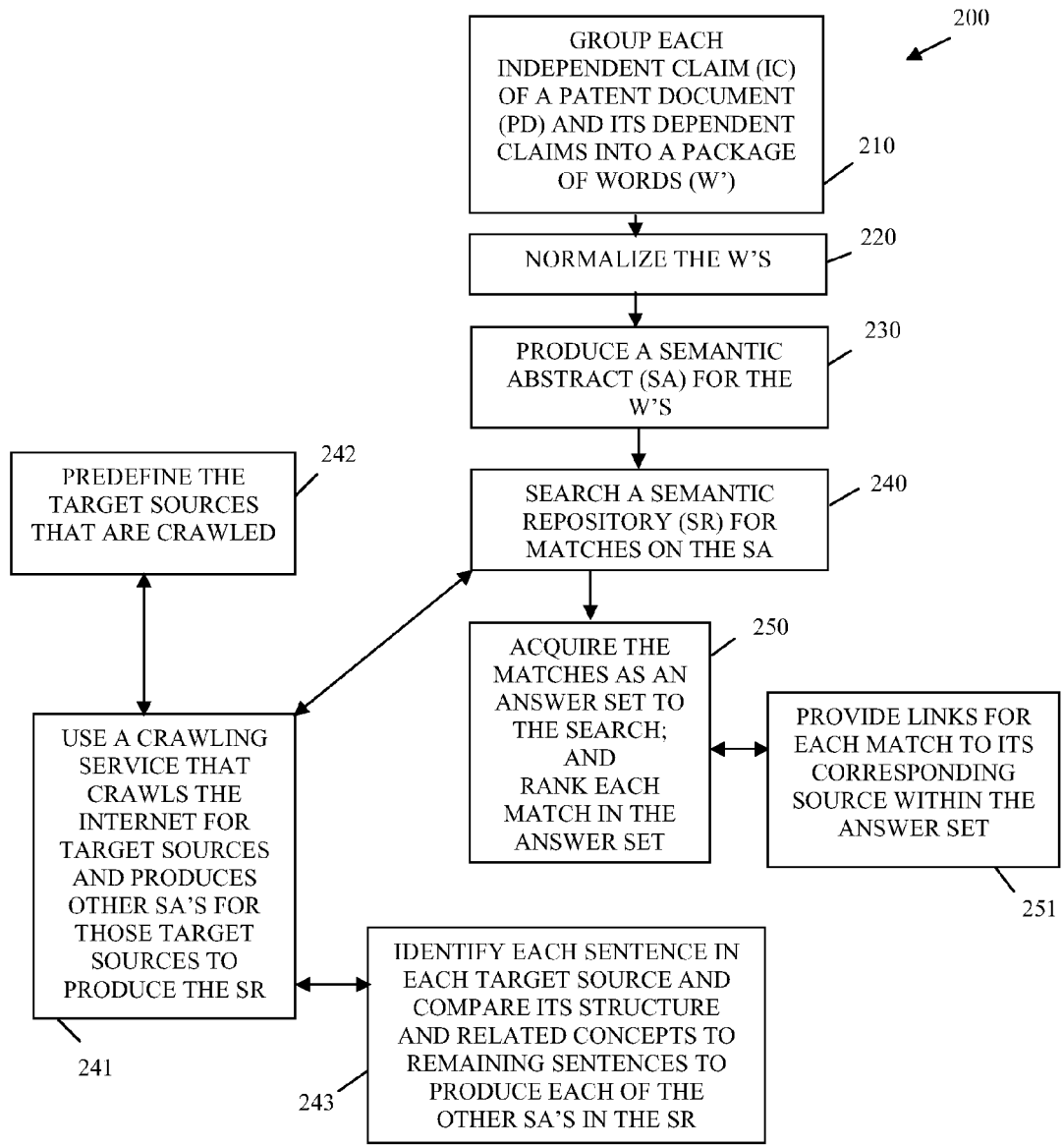
FIG. 2 is a diagram of a method for packaging claims and acquiring related data sources in response to the claim package, according to an example embodiment.

FIG. 2 is a diagram of a method 200 for packaging claims and acquiring related data sources in response to the claim package, according to an example embodiment. The method 200 (hereinafter "patent claim evaluation service" is implemented in a machine-accessible and readable medium and is operational over a network. The network may be wired, wireless, or a combination of wired and wireless. In an embodiment, the patent claim evaluation service presents an alternative view and in some cases enhanced perspective of the patent claim search service represented by the method 100 of the FIG. 1.

At 210, the patent claim evaluation service groups each independent claim of a patent document and its dependent claims into a package of words. Thus, a particular claimed embodiment and its variations are collected and represented in the package of words.

At 220, the patent claim evaluation service normalizes the words. A whole variety of techniques and normalization techniques were described in detail above with reference to the method 100 of the FIG. 1.

At 230, the patent claim evaluation service produces a semantic abstract for the normalized words. Examples for defining a semantic abstract and defining semantic spaces were described above and incorporated by reference above herein.

At 240, the patent claim evaluation service searches a semantic repository for matches on the semantic abstract. The search may be confined to a semantic (conceptual space) for which the semantic abstract is associated so as to optimize the search precision and recall and processing efficiency.

According to an embodiment, at 241, the patent claim evaluation service uses one or more Internet crawling services that crawl the Internet for target sources or World-Wide Web (WWW) sites. The crawling services are designed to collect documents and information (video, audio, pictures, graphs—all of which include some form a metadata indexing that the crawling service uses) from the WWW sites. The documents and information (metadata associated with the information in the case of multimedia) are used to produce the semantic repository having a variety of additional semantic abstracts.

In some cases, at 242, the patent claim evaluation service uses predefined and configured target sources to crawl and build the semantic repository.

In an embodiment, at 243, the patent claim evaluation service indentifies each sentence in each target source and compares its structure and related concepts to remaining sentences in that target source to produce each of the semantic abstracts in the semantic repository. Examples of this were discussed above with reference to the method 100 of the FIG. 1.

The repository can be dynamically produced or produced in batch ahead of time via crawling services that build the semantic abstracts as a repository. This may be viewed in a manner similar to how online search engines crawl the WWW to build search indexes, but here semantic abstracts from target sources are produced for purpose of efficient and novel patent claim searching.

According to an embodiment, at 250, the patent claim evaluation service acquires matches from the repository as an answer set to the search and then ranks each match within the answer set in accordance with its assigned rank; the higher the rank the greater the perceived relevance.

In some cases, at 251, the patent claim evaluation service provides links, such as HTTP URL (Uniform Resource Locator) or URI (Universal Resource Identifier) links, for each match to its corresponding full data source. The links are provided within the answer set for access by the user.

So, it is now appreciated how a set of claims for a patent can be packaged, normalized, transformed into a semantic abstract and then compared against a large repository of sources having semantic abstracts to produce an answer set. The answer set provides the user with a good indication of the state of the art and products in use as defined by the claim package. This is done in an automated fashion and has the potential to revolutionize the manner in which patent searching is conducted and save agencies, enterprises, and governments a tremendous amount of time and resources.

Figure 3:
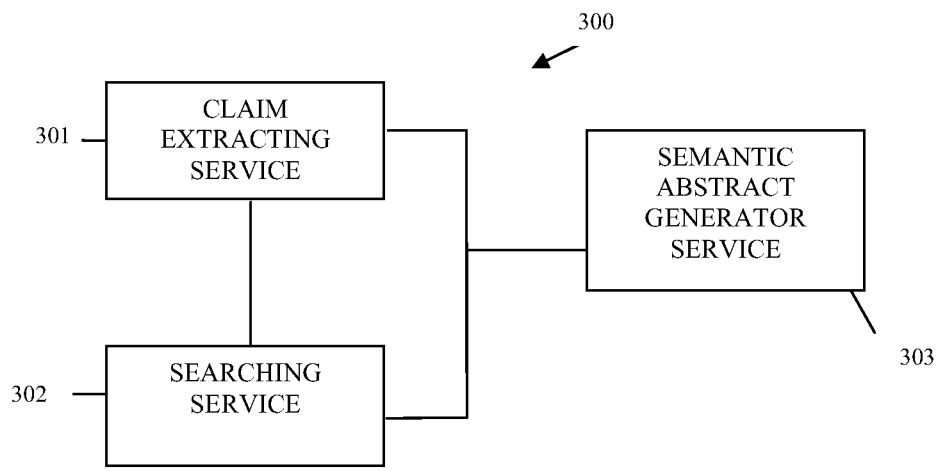
FIG. 3 is a diagram of a patent claim impact system, according to an example embodiment.

FIG. 3 is a diagram of a patent claim impact system 300, according to an example embodiment. The patent claim impact system 300 is implemented in a machine-accessible and readable medium as instructions that process on one or more machines. Moreover, the patent claim impact system 300 is operational over a network. The network may be wired, wireless, or a combination of wired and wireless. In an embodiment, the patent claim impact system 300 implements, among other things, the patent claim search service and the patent claim evaluation service represented by the methods 100 and 200 of the FIGS. 1 and 2, respectively.

The patent claim impact system 300 includes a claim extracting service 301 and a searching service 302. In an embodiment, the patent claim impact system 300 also includes a semantic abstract generator service 303. Each of these will now be discussed in turn.

The claim extracting service 301 is implemented in a machine-accessible and computer-readable medium as instructions. The instructions process on a machine (computer or processor enabled device having a processor and memory). Example processing associated with the claim extracting service 301 was described in detail above with reference to the methods 100 and 200 of the FIGS. 1 and 2, respectively.

The claim extracting service 301 extracts a claim from a patent document. The extracted words of the claim are passed to a semantic abstract generator service 303 (discussed in more detail below). The semantic generator service 303 produces a semantic abstract for the extracted claim words and then passes the semantic abstract as a search to the searching service 302. The searching service 302 uses the semantic abstract as a search into a repository of semantic abstracts.

The searching service 302 is implemented in a machine-accessible and computer-readable medium as instructions. The instructions process on the same machine as the claim extracting service 301 or an entirely different machine of the network. Example features of the searching service 302 were described above with reference to the methods 100 and 200 of the FIGS. 1 and 2, respectively.

The searching service 302 is configured to match the related semantic abstracts in response to a defined semantic distance. So, matches can be on the bases of scores as discussed above or on the bases of semantic calculated distances.

According to an embodiment, the searching service 302 takes matches within the semantic distances from the repository and forms an answer set. The abstracts in the answer set are then organized in rank order where the abstract with the lowest detected semantic distance from the search query abstract (of the patent claim) is listed first in the answer set and the abstract with the highest permissible semantic distance is listed last in the answer set.

In some cases, a threshold value for the semantic distance can be defined by a user or configured by an administrator.

The patent claim impact system 300 also includes the semantic abstract generator service 303. The semantic abstract generator service 303 is implemented in a machine-accessible and computer-readable medium as instructions. The instructions process on the same machine outlined above or an entirely different machine of the network. Example semantic abstract generator services 303 were discussed and incorporated herein and above.

In an embodiment, the semantic abstract generator service 303 translates the words of the extracted claim into a target spoken language. Also, the semantic abstract generator service 303 stems the words to their morphological roots and augments the words with synonyms and/or thesauri terms. The augmentation can be done on the bases of domain specific lexicons and dictionaries.

Figure 4:
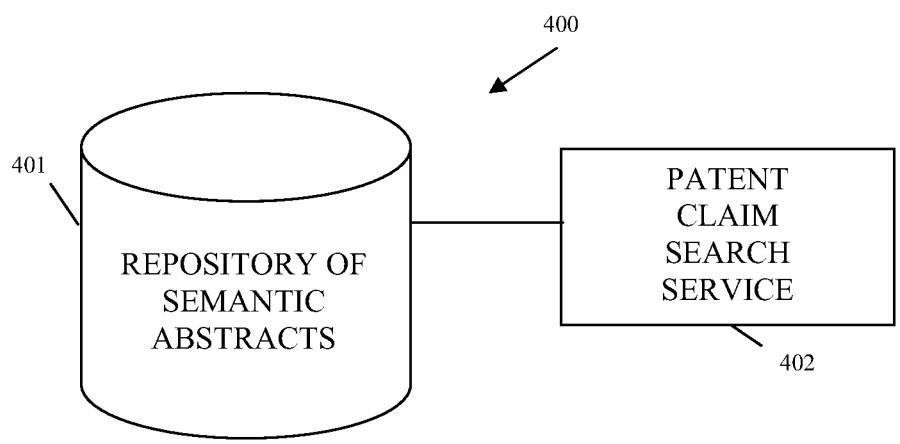
FIG. 4 is a diagram of another patent claim impact system, according to an example embodiment.

FIG. 4 is a diagram of another patent claim impact system 400, according to an example embodiment. The patent claim impact system 400 is implemented in a machine-accessible and computer-readable medium and is processed on machines by services of a network. The network may be wired, wireless, or a combination of wired and wireless.

The patent claim impact system 400 includes a repository of semantic abstracts 401 and a patent claim search service 402. Each of these and their interactions with one another will now be discussed in turn.

The repository of semantic abstracts 401 is implemented in a machine-accessible and computer-readable medium and is accessible to and managed by the patent claim search service 402.

The repository of semantic abstracts 401 includes target or candidate semantic abstracts built from target data sources of information, such as predefined Internet WWW sites. In an embodiment, the repository of semantic abstracts 401 is dynamically constructed in response to some target sources. In other words, some sites can be dynamically processed to produce their semantic abstracts.

According to an embodiment, the repository of semantic abstracts 401 uses crawling services of the WWW to periodically crawl the Internet and the WWW and acquire data sources (documents and/or multimedia with metadata text).

The patent claim search service 402 is implemented in a machine-accessible and computer-readable medium as instructions that process on a machine of the network. Example processing associated with the patent claim search service 402 was discussed in detail above with reference to the FIGS. 1-3.

The patent claim search service 402 generates an abstract for a claim of a patent document. The patent claim search service 402 then uses the abstract to search the repository 401. The patent claim search service 402 then returns matching abstracts from the repository 401 that match the original abstract, which was used as the search query and which represents the claim for the patent document that was extracted.

In an embodiment, the patent claim search service 402 normalizes words of the claim before performing the search against the repository 401 with the abstract.

In another case, the patent claim search service 402 orders the matching abstracts in response to a relevancy ranking.

Example scenarios and techniques for normalizing and rank ordering were provided in detail above with reference to the methods 100 and 200 of the FIGS. 1 and 2, respectively and the system 300 of the FIG. 3.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A machine-implemented method to execute on a processor, comprising:

extracting, by the processor, claims from a patent document;

normalizing, by the processor, the claims into an extracted normalized claim format and retaining structure defined in the claims within the extracted normalized claim format to identify particular limitations of the claims and retaining within the extracted normalized format a frequency of occurrence of each particular word identified in the claims used to identify rankings for each particular word occurring within the claims, and wherein noise words are removed from the normalized format, the noise words provided by a user as a set of known noise words based on a technology associated with the claims, and thesauri words are added to the normalized format, and wherein normalizing further includes translating the claims to a target spoken language, and wherein normalizing further includes stemming remaining words to their morphological roots after the noise words are removed, and wherein normalizing further includes associating synonyms with the stemmed and remaining words and acquiring the synonyms from a domain specific lexicon relevant to the patent document and the synonyms represented in morphological formats;

producing, by the processor, an abstract representing the normalized claim format, the abstract is a combination of particular terms and particular metadata;

receiving, by the processor, a user-defined ranking selected by the user from a range of 0-10;

comparing, by the processor, the abstract against a repository of additional abstracts, via a score assigned to the abstract and additional scores assigned to the additional abstracts and evaluating a result against a predefined range to determine related ones of the additional abstracts to the abstract based on the user-defined ranking, and wherein a degree to which concepts are expanded within the abstract is determined by the user-defined ranking allowing the user to control a precision and a recall associated with expanding the concepts; and returning, by the processor, the related ones of the additional abstracts.

2. The method of claim 1, wherein producing further includes packaging the normalized claim format to include a normalized independent claim together with normalized dependent claims that depend from an independent claim.

3. The method of claim 1, wherein producing further includes assigning categories and defining relationships between those categories within the abstract.

4. The method of claim 1, wherein comparing further includes matching categories and relationships defined within the abstract to other categories and other relationships defined within the additional abstracts in order to find the related ones.

5. A machine-implemented method to execute on a processor, comprising:

grouping, by the processor, each independent claim of a patent document and its dependent claims into a package of words;

normalizing, by the processor, the words and retaining structure defined in independent claim during normalization to identify particular limitations of each independent claim and retaining during normalization a frequency of occurrence of each particular word identified in each independent claim, which is used to identify rankings for each particular word occurring within each independent claim, and removing noised words, the noise words provided by a user as a set of known noise words based on a technology associated with the claims, and thesaurus words are added for the normalized words, and wherein normalizing further includes translating the words into a target spoken language, and wherein normalizing further includes stemming remaining words to their morphological roots after the noise words are removed, and wherein normalizing further includes associating synonyms with the stemmed and remaining words and acquiring the synonyms from a domain specific lexicon relevant to the patent document and the synonyms represented in morphological formats;

producing, by the processor, a semantic abstract for the words, the semantic abstract is a combination of particular terms and particular metadata;

receiving, by the processor, a user-defined ranking selected by the user from a range of 0-10; and searching, by the processor, a semantic repository for matches on the semantic abstract the search of the semantic repository confined to a conceptual space associated with the semantic abstract where additional abstracts are dynamically generated from the conceptual space of the semantic repository before searching and the search done against the additional abstracts, and wherein a degree to which concepts are expanded within the semantic abstract is based on the user-defined ranking allowing the user to control a precision and a recall associated with expanding the concepts.

6. The method of claim 5 further comprising:

acquiring, by the processor, the matches as an answer set to the searching; and ranking, by the processor, each match in the answer set.

7. The method of claim 6 further comprising, providing, by the processor, links for each match to its corresponding complete source within the answer set.

8. The method of claim 6, wherein searching further includes receiving a semantic distance for conducting the searching to be a configurable parameter, wherein the semantic distance defines a permissible distance between the concepts defined in the semantic abstract vis-à-vis other semantic abstracts included in the semantic repository.

9. The method of claim 6, wherein searching further includes using a crawling service that crawls the Internet for target sources and producing other semantic abstracts for those target sources to produce the semantic repository.

10. The method of claim 9, wherein producing further includes identifying each sentence in each of the target sources and for each sentence compare its semantic structure and related concepts to remaining ones of the sentences in order to produce each of the other semantic abstracts in the semantic repository.

11. The method of claim 9 further comprising, predefining the target sources that are crawled.

* * * * *